United States Patent
Yu

(10) Patent No.: US 9,103,347 B2
(45) Date of Patent: Aug. 11, 2015

(54) FAN DEVICE

(75) Inventor: Po-Hao Yu, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 477 days.

(21) Appl. No.: 13/180,520

(22) Filed: Jul. 11, 2011

(65) Prior Publication Data

US 2012/0163973 A1   Jun. 28, 2012

(30) Foreign Application Priority Data

Dec. 22, 2010 (TW) .............................. 99145308 A

(51) Int. Cl.
| | |
|---|---|
| *F04D 25/06* | (2006.01) |
| *H02K 5/04* | (2006.01) |
| *H02K 5/22* | (2006.01) |
| *H02K 11/00* | (2006.01) |
| *F04D 19/00* | (2006.01) |
| *F04D 29/52* | (2006.01) |

(52) U.S. Cl.
CPC .......... *F04D 25/0613* (2013.01); *F04D 19/002* (2013.01); *F04D 25/0633* (2013.01); *H02K 5/04* (2013.01); *H02K 5/22* (2013.01); *H02K 11/0068* (2013.01); *F04D 25/0693* (2013.01); *F04D 29/522* (2013.01); *H02K 2211/03* (2013.01)

(58) Field of Classification Search
CPC .......... H02K 2211/03; H02K 2211/06; H02K 2211/09; H02K 2211/12; H02K 11/0068; H02K 11/0073; H02K 5/00; H02K 5/04; H02K 5/22; F04D 19/002; F04D 25/0613; F04D 25/0633; F04D 25/0693; F04D 25/08; F04D 29/522

USPC .............. 417/313, 424.1, 354, 423.1–423.14; 416/223 R, 243, DIG. 2; 310/62–63, 89, 310/68 R, 68 D

See application file for complete search history.

(56) References Cited

U.S. PATENT DOCUMENTS

| | | | | |
|---|---|---|---|---|
| 5,099,181 | A * | 3/1992 | Canon ....................... | 318/400.08 |
| 5,393,197 | A * | 2/1995 | Lemont et al. ............... | 415/68 |
| 6,293,753 | B1 * | 9/2001 | Pal et al. ....................... | 415/221 |
| 6,375,440 | B2 * | 4/2002 | Kosugi ..................... | 417/423.14 |
| 6,381,406 | B1 * | 4/2002 | Smith et al. ................... | 318/799 |
| 7,177,149 | B2 * | 2/2007 | Lin ............................. | 361/695 |
| 2003/0019646 | A1 * | 1/2003 | Clements et al. ............. | 174/50 |
| 2005/0105271 | A1 * | 5/2005 | Lu et al. ....................... | 361/695 |
| 2005/0106046 | A1 * | 5/2005 | Winkler ....................... | 417/423.3 |
| 2008/0124234 | A1 * | 5/2008 | Echazarreta ............. | 417/423.14 |
| 2008/0279694 | A1 * | 11/2008 | Chou et al. ............... | 416/244 R |

FOREIGN PATENT DOCUMENTS

| | | |
|---|---|---|
| TW | 200845878 A | 11/2008 |
| TW | 201042155 A | 12/2010 |

\* cited by examiner

*Primary Examiner* — Devon Kramer
*Assistant Examiner* — Joseph Herrmann

(57) ABSTRACT

A fan device includes an impeller, a motor, a fan frame, a circuit board and a covering member. The motor is used for driving rotation of the impeller. The fan frame includes an axial-flow channel for accommodating the impeller and the motor and includes a receptacle. The receptacle is defined by two airflow inlet/outlet plates, one channel wall and two lateral plates. The circuit board is accommodated within the receptacle. The covering member is used for sheltering the receptacle.

10 Claims, 6 Drawing Sheets

FAN DEVICE

FIELD OF THE INVENTION

The present invention relates to a fan device, and more particularly to a fan device with an improved fan frame.

BACKGROUND OF THE INVENTION

With increasing development of science and technology, the functions and operating speeds of various electronic devices are gradually enhanced. For maintaining normal operations, a forced convection mechanism (e.g. a fan) is installed in the electronic device to dissipate heat that is generated by the electronic components of the electronic device. Consequently, the electronic device can be maintained at the normal operating temperature.

FIG. 1 is a schematic exploded view illustrating a conventional fan device. As shown in FIG. 1, the conventional fan device 1 includes an impeller 11, a rotor structure 121, a stator structure 122, a circuit board 123 and a motor base 13. The circuit board 123 is configured to change the direction of the magnetic pole current flowing through the stator structure 122. Due to the change of the magnetic pole current, the rotor structure 121 is rotated. As the rotor structure 121 is rotated, the impeller 11 is simultaneously rotated with the rotor structure 121.

As the electronic device is developed toward high performance and miniaturization, the heat-dissipating efficacy of the electronic device should be taken into consideration. For example, as the demands on the performance of the servers of a server system are gradually increased, the heat generated by the server system is increased. For effectively dissipating the heat, a single fan device is usually replaced by two fan devices in series. Under this circumstance, the fabricating cost is largely increased. In views of cost-effectiveness, it is important to increase the heat-dissipating efficacy of the single fan devices.

Conventionally, the increase of the rotating speed of the fan device may enhance the performance of the fan device by using a large current to drive rotation of the motor. Under this circumstance, the number or volume of the electronic components mounted on the circuit board of the fan device needs to be increased. Since the number or volume of the electronic components mounted on the circuit board is increased, a larger-sized circuit board should be used to increase the current capacity. Since the circuit board 123 is installed between the winding assembly of the stator structure 122 and the motor base 13, the larger-sized circuit board may block the airflow channel. If the airflow amount is reduced, the performance of the fan device is deteriorated.

For preventing the circuit board from hindering the airflow channel, the circuit board may be installed outside the fan frame of the fan device. However, since the circuit board is installed outside the fan frame, the volume of the server or other electronic device should be increased to provide a larger space to accommodate the circuit board. Under this circumstance, the applications of the fan device for the client are restricted and the market acceptance thereof is insufficient. Therefore, there is a need of providing a fan device with an improved fan frame in order to increase the space utilization of the circuit board and the performance of the fan device without hindering the airflow channel and increasing the overall volume of the fan device.

SUMMARY OF THE INVENTION

It is an object of the present invention to provide a fan device with an improved fan frame for increasing the space utilization of the circuit board and the performance of the fan device without hindering the airflow channel and increasing the overall volume of the fan device so that two fan devices in series can be replaced by a single fan device to reduce the fabricating cost.

In accordance with an aspect of the present invention, there is provided a fan device. The fan device includes an impeller, a motor, a fan frame, a circuit board and a covering member. The motor is used for driving rotation of the impeller. The fan frame includes an axial-flow channel for accommodating the impeller and the motor and includes a receptacle. The receptacle is defined by two airflow inlet/outlet plates, one channel wall and two lateral plates. The circuit board is accommodated within the receptacle. The covering member is used for sheltering the receptacle.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a fan device with an improved fan frame. By the fan frame, the layout space of the circuit board is largely enhanced without the need of increasing the volume of the fan device. Since the fan device of the present invention can be driven by a large current, the performance of the fan device is largely enhanced and the fabricating cost is reduced by using the single fan device to replace with two fan devices in series.

Figure 1:
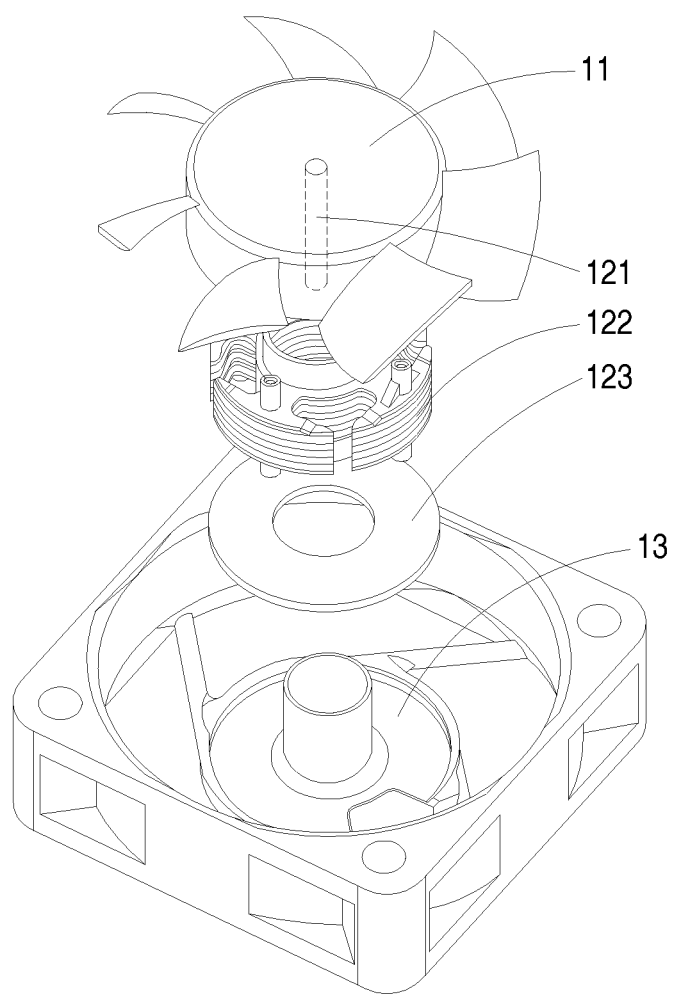
FIG. 1 is a schematic exploded view illustrating a conventional fan device.
Figure 2:
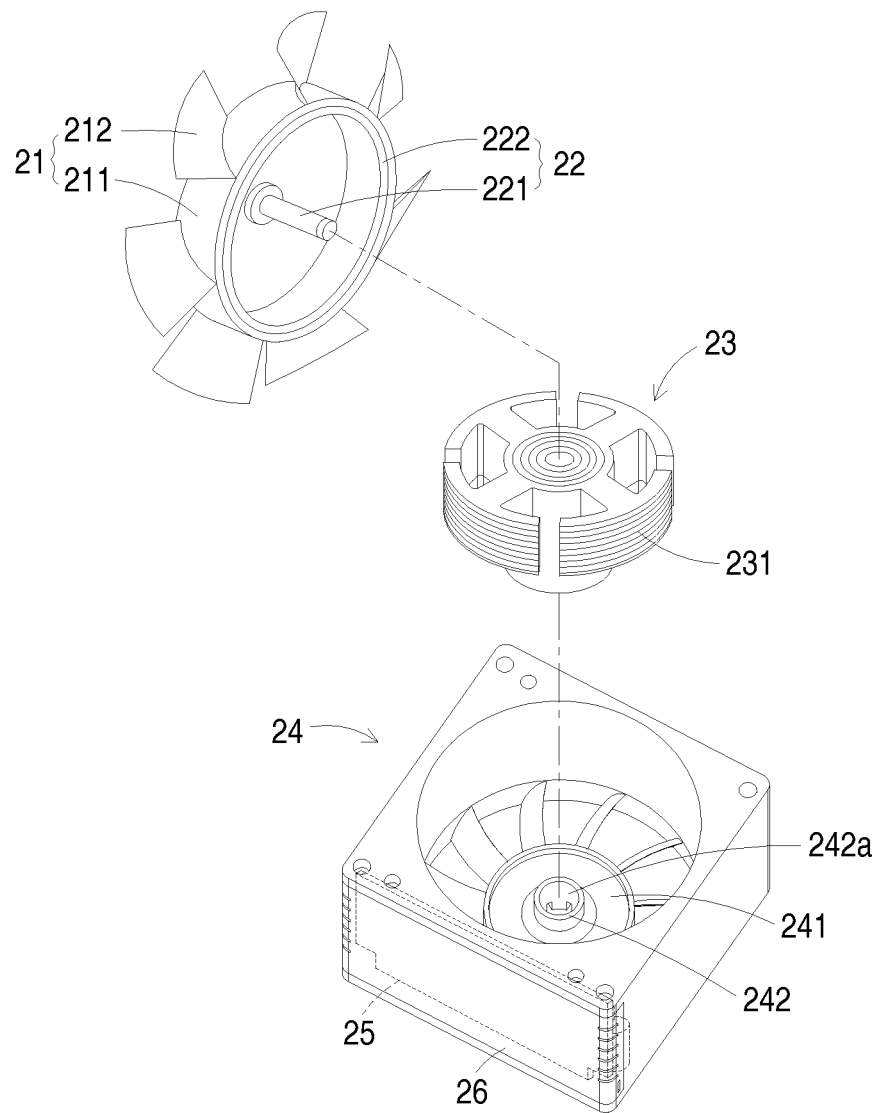
FIG. 2 is a schematic exploded view illustrating a fan device according to a first embodiment of the present invention.

FIG. 2 is a schematic exploded view illustrating a fan device according to a first embodiment of the present invention. As shown in FIG. 2, the fan device 2 includes an impeller 21, a motor, a fan frame 24, a circuit board 25 and a covering member 26. The impeller 21 includes a hub 211 and a plurality of blades 212. The blades 212 are disposed around the periphery of the hub 211. The motor includes a rotor structure 22 and a stator structure 23, and the motor is configured to drive rotation of the impeller 21. The rotor structure 22 includes a shaft 221 and a magnetic element 222. The shaft 221 is connected to the center of the hub 211. The magnetic element 222 is attached on the inner surface of the hub 211. An example of the magnetic element 222 includes but is not limited to a permanent magnet, an electromagnet or a magnet. The stator structure 23 includes a plurality of stator magnetic poles 231. Each of the stator magnetic poles 231 is formed by winding a coil. Moreover, the stator magnetic poles 231 are enclosed by the magnetic element 222 of the rotor structure 22.

The fan frame 24 includes a base 241 and a shaft tube 242. The base 241 is connected with the fan frame 24. The shaft tube 242 is disposed on the base 241, and has an opening 242a. An end of the shaft 221 of the rotor structure 22 is inserted within the opening 242a of the shaft tube 242. Moreover, the stator structure 23 is sheathed by the shaft tube 242. In other words, the impeller 21, the rotor structure 22 and the stator structure 23 are accommodated within the fan frame 24.

Moreover, an axial-flow channel is defined within the fan frame 24 for accommodating the impeller 21 and the motor. The fan frame 24 has four lateral sides in parallel with the axial-flow channel. The circuit board 25 is located at a specified lateral side of four lateral sides of the fan frame 24. That is, a receptacle is formed at the specified lateral side of the fan frame 24 for accommodating the circuit board 25. After the receptacle is sheltered by the covering member 26, the receptacle is a sealed space for protecting the circuit board 25.

Figure 3:
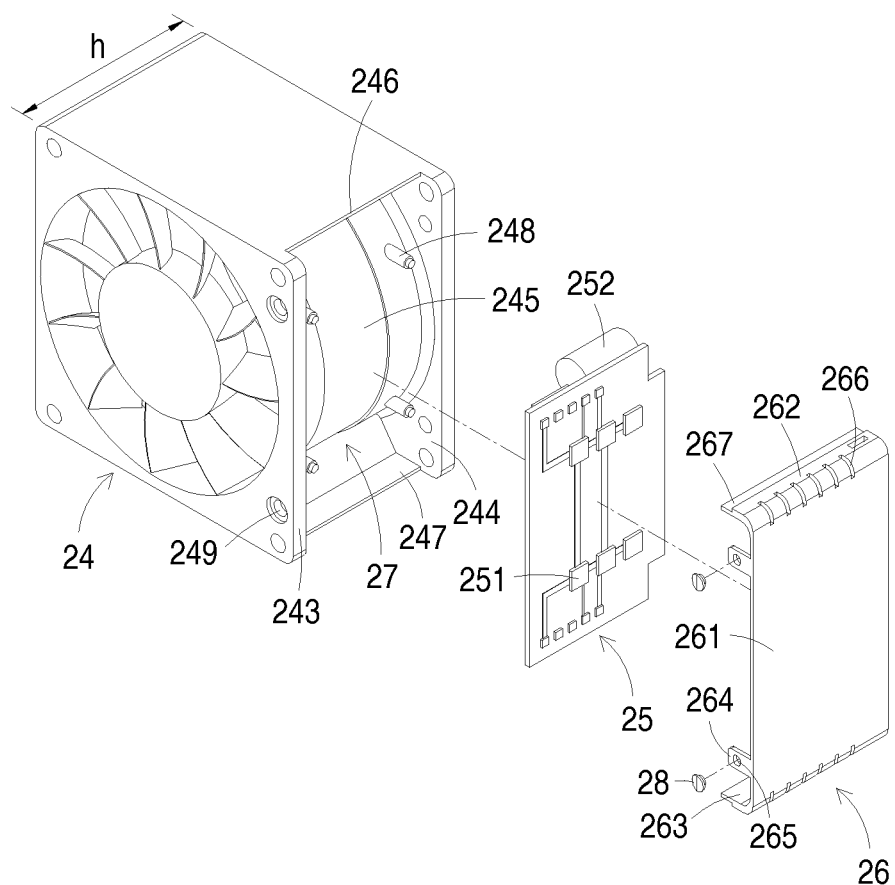
FIG. 3 is a schematic exploded view illustrating the relationship between the fan frame, the circuit board and the covering member of the fan device according to the first embodiment of the present invention.

FIG. 3 is a schematic exploded view illustrating the relationship between the fan frame, the circuit board and the covering member of the fan device according to the first embodiment of the present invention. As shown in FIG. 3, the axial-flow channel is enclosed by a channel wall 245. In addition, the fan frame 24 has two airflow inlet/outlet plates 243 and 244. The airflow inlet and the airflow outlet are formed in the airflow inlet/outlet plates 243 and 244 and in communication with the axial-flow channel. Two lateral plates 246 and 247 are located at two lateral sides of the fan frame 24 and perpendicular to the airflow inlet/outlet plates 243 and 244. In accordance with a key feature of the present invention, the receptacle 27 is defined by the airflow inlet/outlet plates 243 and 244, the channel wall 245 and the lateral plates 246 and 247. In some embodiments, at least one fixing post 248 is extended from the channel wall 245 and accommodated within the receptacle 27. The fixing post 248 is sustained against the circuit board 25 for fixing the circuit board 25.

In this embodiment, the circuit board 25 is a rigid circuit board. Moreover, a plurality of electronic components 251 (e.g. inductors or transformers) and a large-sized capacitor 252 are mounted on the circuit board 25. The large-sized capacitor 252 is arranged at the edge of the circuit board 25. Since the channel wall 245 is one sidewall of the receptacle 27 and the channel wall 245 has an arc-shaped surface, the upper portion or the lower portion of the receptacle 27 is sufficiently large to accommodate the large-sized capacitor 252. Moreover, the circuit board 25 is electrically connected with the stator structure 23 of the motor through a conducting wire or a flat cable (not shown), thereby driving the stator magnetic poles 231 of the stator structure 23.

The covering member 26 is substantially U-shaped. In addition, the covering member 26 includes a bottom plate 261 and two flank plates 262 and 263. The flank plates 262 and 263 are substantially perpendicular to the bottom plate 261. The shape and size of the bottom plate 261 are substantially identical to those of the lateral plate of the fan frame 24. After the receptacle 27 is covered by the covering member 26, the receptacle 27 is not exposed and the fan frame 24 is a complete fan frame. Since the receptacle 27 is formed by removing a specified lateral side of the fan frame 24, the volume of the fan device is not increased. Moreover, by viewing the airflow inlet/outlet plate 243 or 244, the aspect ratio of the fan device is in a range from 0.8 to 1.2. Preferably, the aspect ratio of the fan device is 1. In this situation, the cross-section of the fan frame has a square shape.

For fixing the covering member 26 on the fan frame 24, the covering member 26 has a plurality of extension parts 264. The extension parts 264 are perpendicular to the bottom plate 261 and extended toward the fan frame 24. The extension parts 264 have respective fixing holes 265. The airflow inlet/outlet plates 243 and 244 have corresponding fixing holes 249 mating with the fixing holes 265. By penetrating corresponding fastening elements 28 through the fixing holes 249 and 265, the covering member 26 is fixed on the fan frame 24. An example of the fastening element 28 includes but is not limited to a tenon or a rivet.

The covering member 26 further includes a plurality of ventilation holes 266 for facilitating removing the heat from the circuit board 25 in a natural convection manner. It is preferred that the ventilation holes 266 are located at the junction zones between the bottom plate 261 and the flank plates 262 and 263 in order to reduce the possibility of falling down the foreign dusk on the circuit board 25. It is noted that the locations of the ventilation holes 266 may be varied according to the practical requirements. For example, the ventilation holes 266 may be located at the periphery of the bottom plate 261.

Figure 4:
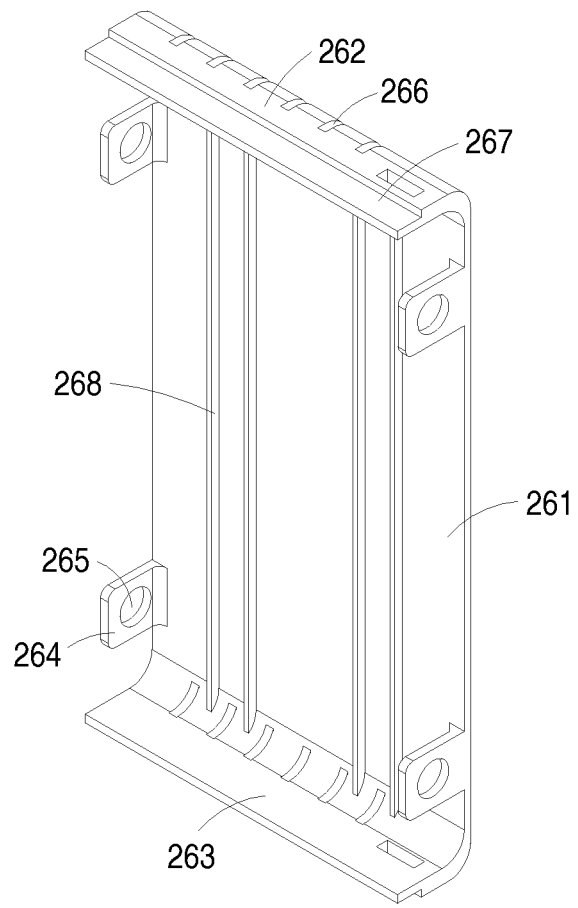
FIG. 4 is a schematic perspective view illustrating an exemplary covering member used in the fan device of the present invention.

Due to the flank plates 262 and 263, two opposite sides of the covering member 26 are in L-shaped structures so that the connecting strength between the covering member 26 and the fan frame 24 will be enhanced. In some embodiment, corresponding to the lateral plates 246 and 247, the tips of the flank plates 262 and 263 are formed as stepped structures 267. The stepped structures 267 are engaged with the lateral plates 246 and 247 of the fan frame 24 so that the covering member 26 is combined with the fan frame 24. Moreover, for enhancing the structural strength of the covering member 26, a plurality of reinforcement ribs 268 are formed on the bottom plate 261 of the covering member 26 (see FIG. 4).

Figure 5:
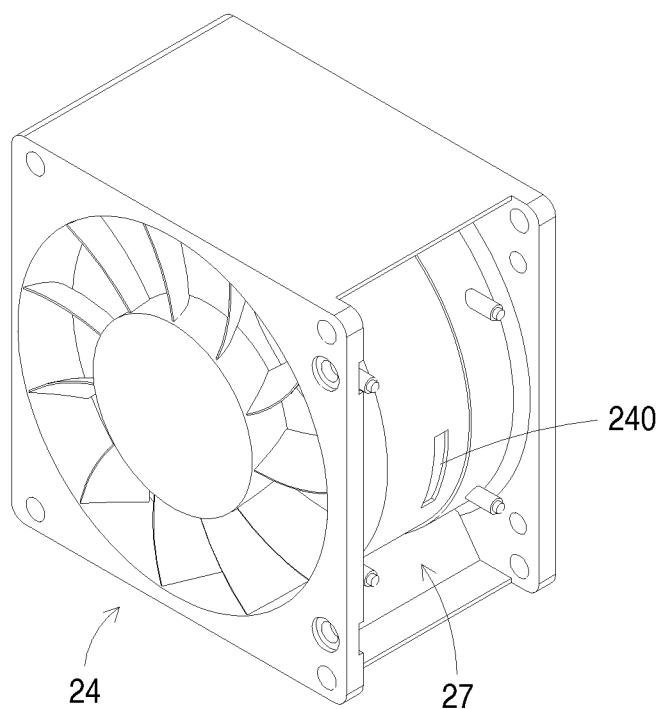
FIG. 5 is a schematic perspective view illustrating a fan frame of a fan device according to a second embodiment of the present invention.
Figure 6:
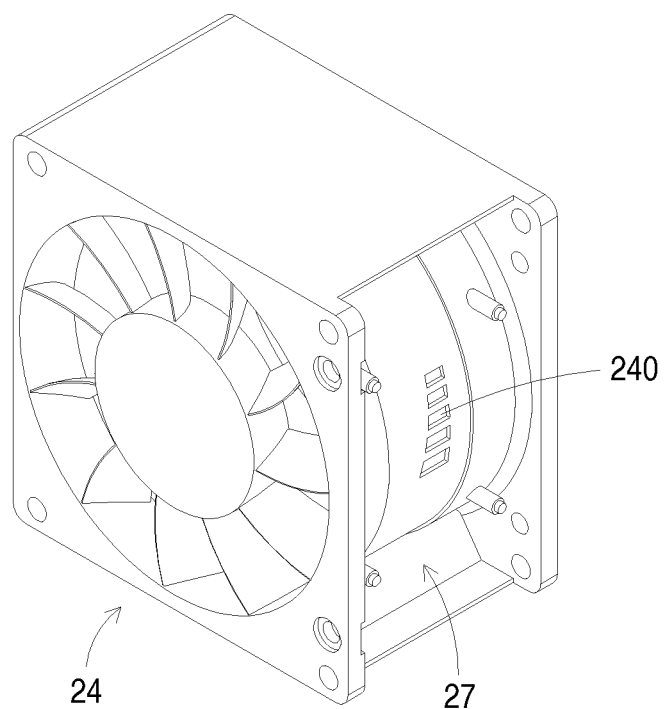
FIG. 6 is a schematic perspective view illustrating a fan frame of a fan device according to a third embodiment of the present invention.

FIG. 5 is a schematic perspective view illustrating a fan frame of a fan device according to a second embodiment of the present invention; and FIG. 6 is a schematic perspective view illustrating a fan frame of a fan device according to a third embodiment of the present invention. For enhancing the heat-dissipating efficiency of the circuit board 25, at least one ventilation slot 240 is formed in the channel wall 245 of the fan frame 24. A portion of airflow generated from the rotation of the impeller 21 may flow into the receptacle 27 through the ventilation slot 240. Since the heat generated by the circuit board 25 can be partially removed by the airflow, the possibility of burning out the circuit board 25 will be minimized. The ventilation slot 240 can be an elongated ventilation slot as shown in FIG. 5 or a horizontal ventilation slot as shown in FIG. 6. It is noted that the number and shape of the ventilation slots may be varied according to the practical requirements.

Take a fan device with a dimension of 80 mm×80 mm×50 mm for example. Both of the space utilization and the height of the circuit board of the fan may be increased by at least 20%. In such way, a single circuit board can withstand more current when compared with the circuit board of the conventional fan device. For example, a single fan device with a height of 50 mm can withstand the current of about 7~8 ampere, which is equivalent to the current withstood by two conventional fan device with a total height of 76 mm. In other words, the fan device of the present invention has enhanced performance and low fabricating cost.

From the above description, a receptacle is defined by the airflow inlet/outlet plates, the channel wall and the lateral plates of the fan frame of the fan device for accommodating the circuit board. In addition, the receptacle is sheltered by the covering member. Since the receptacle is located at a lateral side of the fan frame, the volume of the fan frame is not largely increased and the airflow channel is not hindered. In such way, the space utilization and the current capacity of the circuit board will be largely increased. Since the fan device of the present invention can be driven by a large current, the performance of the fan device is largely enhanced. Moreover, due to the ventilation holes of the covering member and the ventilation slot of the channel wall of the fan frame, the airflow may be introduced to the receptacle through the ventilation holes and the ventilation slot. Under this circumstance, heat generated by the circuit board may be dissipated away, and the possibility of burning out the circuit board is minimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fan device, comprising:
   an impeller;
   a motor for driving rotation of the impeller;
   a fan frame substantially shaped as a rectangular solid, wherein the fan frame comprises:
      an airflow inlet plate in which an airflow inlet is formed;
      an airflow outlet plate in which an airflow outlet is formed, wherein the airflow inlet plate and the airflow outlet plate are disposed in parallel;
      four lateral plates, each being disposed on each of four edges of the airflow inlet plate and the airflow outlet plate; and
      a channel wall defining an axial-flow channel for accommodating the impeller and the motor, wherein a receptacle, which is an internal space within the fan frame, is defined by the airflow inlet plate, the airflow outlet plate, the channel wall and three of the four lateral plates; and
   a circuit board accommodated within the receptacle,
   wherein one of the four lateral plates is a covering member detachably fixed to two adjacent lateral plates, the airflow inlet plate and the airflow outlet plate to provide an access to the receptacle, wherein the covering member is substantially U-shaped, wherein the covering member comprises a bottom plate and two flank plates, wherein corresponding to the two adjacent lateral plates, the tips of the flank plates are formed as stepped structures, and wherein the stepped structures are engaged with the two adjacent lateral plates which define the receptacle of the fan frame.

2. The fan device according to claim 1, wherein the fan device has a length-to-width ratio in a range from 0.8 to 1.2.

3. The fan device according to claim 1, wherein the circuit board comprises at least one capacitor mounted on a surface close to an edge of the circuit board.

4. The fan device according to claim 1, wherein the covering member comprises a plurality of ventilation holes for facilitating removing the heat from the circuit board in a natural convection manner.

5. The fan device according to claim 1, wherein at least one ventilation slot is formed in the channel wall of the fan frame, so that a portion of airflow generated from the rotation of the impeller is introduced into the receptacle through the ventilation slot to remove heat generated by the circuit board.

6. The fan device according to claim 1, wherein the two flank plates are substantially perpendicular to the bottom plate.

7. The fan device according to claim 1, wherein a plurality of reinforcement ribs are formed on the bottom plate of the covering member for enhancing the structural strength of the covering member.

8. The fan device according to claim 1, wherein the covering member is fixed on the fan frame through a fastening element.

9. The fan device according to claim 1, wherein at least one fixing post is extended from the channel wall and accommodated within the receptacle, wherein the fixing post is sustained against the circuit board for fixing the circuit board.

10. The fan device according to claim 1, wherein the circuit board is a rigid circuit board.

* * * * *